LOW FREQUENCY RADIO TRANSMITTER RADIATING PULSE SIGNALS

Filed Oct. 19, 1966

1

3,458,816
LOW FREQUENCY RADIO TRANSMITTER RADIATING PULSE SIGNALS

William Joseph O'Brien, London, England, assignor to Decca Limited, London, England, a British company Filed Oct. 19, 1966, Ser. No. 587,727
Claims priority, application Great Britain, Mar. 1, 1966, 8,973/66
Int. Cl. H04b *1/04*
U.S. Cl. 325—123 12 Claims

ABSTRACT OF THE DISCLOSURE

In a low frequency radio transmitter radiating pulse signals, interference due to radiation at a particular frequency or frequencies is reduced by providing a filter tuned to that frequency. Signals from a pulsed carrier source are fed into the filter. The phase and amplitude of the output from the filter are adjusted and the resultant signal is combined with the pulsed carrier before the latter is radiated to suppress or reduce signals of the unwanted frequency or frequencies.

This invention relates to low frequency radio transmitters radiating pulse signals and has for its principal object to reduce radiation of signals causing interference at a particular frequency or at a number of frequencies.

The problem of interference arises particularly with Loran "C" transmitters which radiate pulse signals at a frequency of about 100 kc./s.; the side splash from such transmissions may cause interference with low frequency continuous wave systems such as the Decca Navigator transmissions. The invention is applicable also to other low frequency pulse transmitters, e.g. transmitters using amplitude modulation or frequency shift keying for transmitting telegraph or other pulse coded signals.

The usual way of reducing interference by radiation of unwanted frequencies from radio transmitters is to use filters through which the signal to be transmitted is passed. Problems arise however with pulse transmitters. If the amplification following a filter is non-linear or interrupted, any improvement obtained from the filter may be destroyed. If the duty time is small, as in a Loran "C" amplifier, it is costly and difficult to maintain continuous undistorted amplification. If, to avoid these problems, the filtering is put in the output circuitry following the final amplification, other difficulties arise. The bandwidth must be limited so as not to interfere with the leading edge of the radiated pulse; in the case of a Loran "C" transmitter, it is essential to minimise any effect on leading edge.

According to the present invention, in a radio frequency pulse transmitting system having a pulsed carrier source feeding a power output stage coupled to a radiator, to suppress unwanted radiation of a given frequency, there are provided a filter tuned to said given frequency, means for feeding signals from said pulsed carrier source into said filter, means for adjusting the phase and amplitude of the output signal from the filter and means for combining the phase and amplitude adjusted signal with the pulsed carrier whereby unwanted signals of said given frequency may be cancelled. The phase and amplitude adjusted signal may be combined with the input signals to the power output stage to be amplified thereby and fed to the radiator or they may be combined with the output of the power output stage; in the latter case, a separate power amplifier stage would normally be required for amplifying the phase adjusted signal.

2

It will be seen that, by the arrangement described above, at a selected frequency at which it is required to suppress any radiation, a signal is produced which can be adjusted in amplitude and phase and which is used to cancel or minimise the unwanted signals. Most conveniently, a monitor is provided for receiving the radiated signals and indicating the amplitude of the residual unwanted radiation; the phase and amplitude of the cancelling or "outphasing" signal may then be adjusted to bring the unwanted signals to a minimum. Usually manual control is adequate since frequent changes in the adjustment would not normally be required.

The filter can be designed to have sufficient delay that the outphasing signal is clear of the leading edge of the transmitted pulse and therefore has no effect on the use of the pulse leading edge as in the Loran "C" system. Moreover, the filter can have sufficient selectivity that it would not affect the fundamental radio frequency signals in the pulse and thus there is no interference with the use of these fundamental frequency signals in a Loran "C" pulse. The filter can moreover be designed so that its output waveform corresponds as closely as possible to the output waveform of the signal to be suppressed. In some cases, it may be desirable to have two or more filters tuned to the same frequency which are switched into operation as required.

To enable optimum adjustment to be effected, conveniently the monitor includes a cathode ray tube display showing the waveform of the residual signal at the frequency to be suppressed.

Commonly it will be necessary to suppress radiation on several frequencies and, in this case, a separate filter with phase and gain adjusting means is provided for each frequency. Conveniently in such a case the various outphasing signals are combined in a mixer before being fed to the power output stage or a separate pulse power amplifier.

The following is a description of two embodiments of the invention, reference being made to the accompanying drawings in which.

Figures 1, 2:
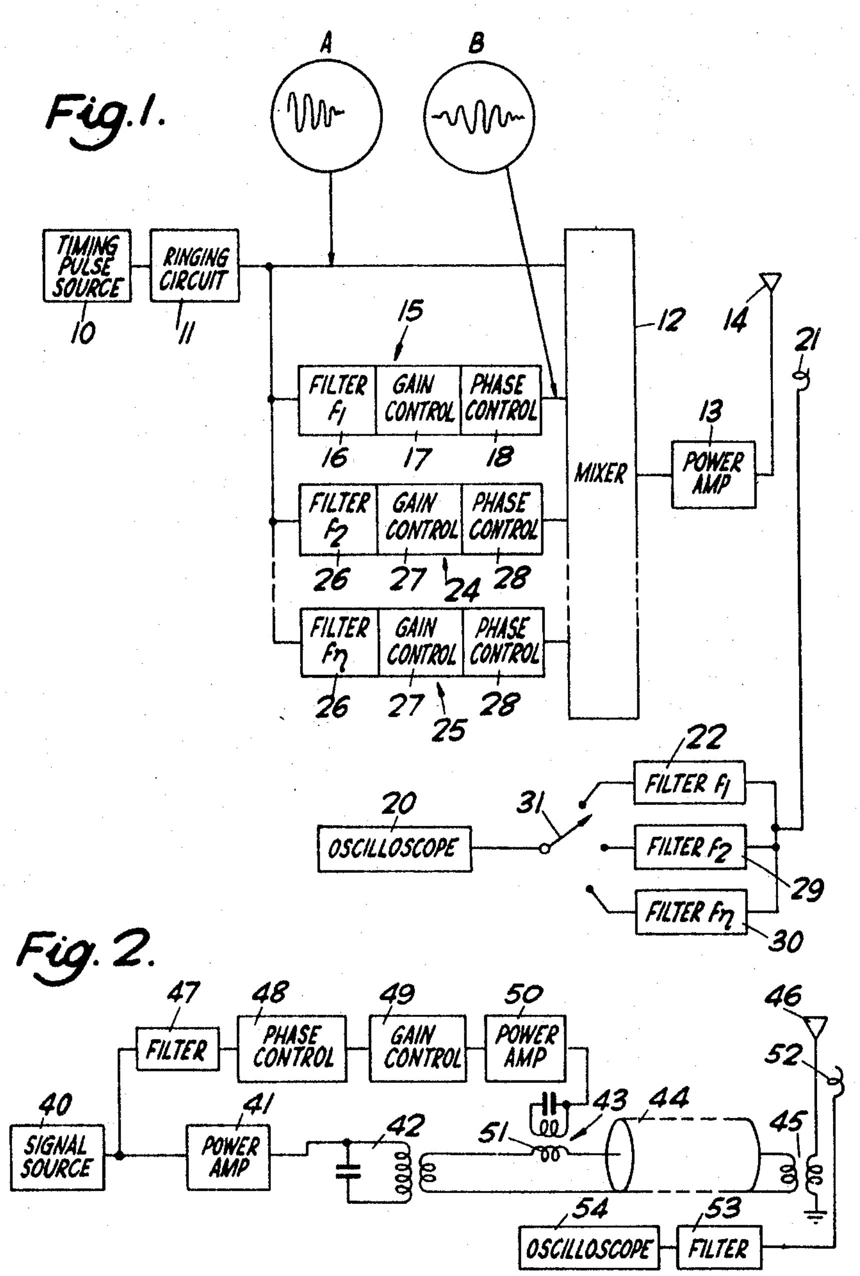
FIGURE 1 is a block diagram illustrating a Loran "C" transmitter.
FIGURE 2 is a block diagram illustrating a telegraphy transmitter.

FIGURE 1 illustrates diagrammatically a Loran "C" transmitter which radiates short duration pulses of a frequency of 100 kc./s. The timing of the pulses is controlled by a timing pulse source indicated as a block 10. These timing pulses are short duration impulses which initiate a ringing circuit 11 tuned to the required radio frequency to produce a short train of radio frequency oscillations, the train having a steep leading edge. The output of the ringing circuit 11 is fed through a mixer 12 to a power amplifier stage 13 which feeds the antenna 14 by which the signals are radiated. The output from said ringing circuit 11 is also fed to a filter unit 15 which comprises a band-pass filter 16, a gain control 17 and a phase adjusted 18. The output of the filter unit 15 is fed to the mixer 12.

The voltage waveforms of the ringing circuit output and the filter unit output are shown at A and B respectively. It will be noted that the ringing circuit output shown at A has a waveform envelope with a sharply rising leading edge. The signal consists of a train of oscillations at the carrier frequency, i.e. 100 kc./s. The filter circuit output at B gradually builds up and is negligible at the start of the pulse. It does not therefore affect the leading edge of the pulse output from the mixer 12. The filter output consists of a train of oscillations at the frequency of the unwanted signal. The phase and amplitude of these oscillations is adjusted to give cancellation of the unwanted signals fed to the mixer 12 directly from the ringing circuit 11. Adjustment of the phase and amplitude is effected manually using the gain control 17 and phase adjuster 18 so as to give the optimum cancellation as displayed on a cathode ray oscilloscope 20 of a monitor unit. This monitor unit comprises a pick-up loop or antenna 21 coupled through an amplifier and filter 22, tuned to the same frequency as the filter 16, to the oscilloscope 20 where the signals are displayed as deflection modulation of a time-base trace. The time-base trace may be synchronised by the applied pulses from the amplifier and filter unit 22 or by timing pips from the timing pulse 10. Complete cancellation of the unwanted signals can only occur if the waveform envelope of the output of the filter unit 15 corresponds to the waveform envelope of the unwanted signals in the output of the ringing circuit. In practice, the filter may be designed to have the appropriate delay and selectivity to give adequate cancellation. In some cases it may be desirable to use two or more filter units 15, tuned to the same frequency but having different characteristics or adjusted to give different phase or different gain outputs, which filter units are switched into operation at appropriate times.

More generally, it may be necessary to cancel out unwanted signals of more than one frequency and for this purpose there are provided further filter units of which two are shown at 24 and 25, each having a band-pass filter 26 tuned to the appropriate frequency with an adjustable gain control 27 and phase adjuster 28. The monitor unit would then have corresponding amplifier and filter units 29, 30 tuned to these further frequencies, a switch 31 enabling the signals of any of the unwanted frequencies to be displayed on the oscilloscope 20.

In telegraphy and other low frequency pulse coded transmitters, the power output valves are usually highly biased in a Class "C" state and, in such transmitters, the non-linearity of the power output amplifier stage may be too great to pass both the desired transmission and the signal for outphasing interference. In this case, the arrangement of FIGURE 2 may be employed in which the outphasing signal is combined with the signal to be transmitted after the final amplifier stage. Referring to FIGURE 2, there is shown a source 40 of pulse modulated carrier frequency signals. These signals are fed to a power amplifier stage 41 and thence to a tank circuit 42, a filter trap circuit 43, a transmission line 44, an antenna tuning and matching coil 45 and finally to an antenna 46. The interference outphasing signal is obtained by feeding signals from the source 40 to a selective filter 47, tuned to the frequency of the signals to be cancelled, the output from the filter 47 being fed through a phase adjuster 48 and adjustable gain control 49 to a power amplifier stage 50. This power amplifier stage 50, which is coupled to feed the antenna 46 through the trap circuit 43, has pentodes or other high output resistance valves so that the amplifier stage 50 does not load or absorb signals from the coil 51 in the trap circuit 43. It is desirable also that the peak of the voltage into the power amplifier valves in the amplifier 50 due to the signals from the power amplifier 41 does not coincide with the peak of the voltage resulting from the input to the amplifier 50 from the filter 47; this condition may be met by control of the delay and bandpass of the filter 19. The phase adjuster 48 and gain control 49 are set manually to minimise the unwanted signal, this being done by observation of an oscilloscope of a monitor similar to the monitor of FIGURE 1. In FIGURE 2, the monitor is illustrated as comprising a pick-up coil 52 feeding an amplifier and filter 53, tuned to the frequency to be cancelled, the output of the unit 53 being displayed on a time-base trace of an oscilloscope 54.

I claim:

1. In a pulse transmitting system having a radio frequency pulsed carrier source feeding a power output stage coupled to a radiator; means for suppressing unwanted radiation of a given frequency which means comprises a filter tuned to said given frequency, means for feeding signals from said pulsed carrier source into said filter, means for adjusting the phase and amplitude of the output signal from the filter and means for combining the phase and amplitude adjusted signal with the pulsed carrier whereby unwanted signals of said given frequency may be cancelled.

2. A pulse transmitting system as claimed in claim 1 wherein said means for combining the phase and amplitude adjusted signal with the pulsed carrier comprises means for combining that signal with the input to the power output stage to be amplified thereby and thence fed to the radiator.

3. A pulse transmitting system as claimed in claim 1 wherein said means for combining the phase and amplitude adjusted signal with the pulsed carrier comprises means for combining that signal with the output from the power output stage.

4. A pulse transmitting system as claimed in claim 1 wherein a monitor is provided for receiving the radiated signals and indicating the amplitude of the residual unwanted radiation.

5. A pulse transmitting system as claimed in claim 4 wherein the monitor includes a cathode ray tube display showing the waveform of the residual signal at the frequency to be suppressed.

6. A pulse transmitting system as claimed in claim 1 wherein the filter is arranged to have sufficient delay that the phase and amplitude adjusted signal is clear of the leading edge of the transmitted pulse.

7. A pulse transmitting system as claimed in claim 1 wherein the filter has sufficient selectivity that it would not affect the fundamental radio frequency signals in the pulse.

8. A pulse transmitting system as claimed in claim 1 wherein the filter is designed so that its output waveform corresponds to the waveform of the signal to be suppressed.

9. A pulse transmitting system as claimed in claim 1 wherein two filters tuned to the same frequency are provided.

10. A pulse transmitting system as claimed in claim 1 wherein a number of filters tuned to different frequencies are provided, each with separate phase and amplitude adjusting means.

11. A pulse transmitting system as claimed in claim 10 wherein the outputs from the filters are combined in a mixer before being fed to the power output stage or a separate power amplifier.

12. In a pulse transmitting system for radiating pulses of radio frequency power which pulses have a steeply rising leading edge and in which radiation of a given frequency is to be suppressed, the combination of a radiating antenna, a power output stage coupled to said antenna, a pulsed carrier input source feeding said power output stage, a pick-up for receiving radiation from said antenna, a monitor, including a first filter tuned to said given frequency, coupled to said pick-up for indicating the amplitude of signals of said given frequency received by said pick-up, a second filter tuned to said given frequency, means for feeding signals from said pulsed carrier input source to said second filter, means for adjusting the phase and amplitude of the output from said second filter and means for combining the phase and amplitude adjusted output with the pulses of radio frequency power radiated from said antenna, said second filter having a delay such that the phase and amplitude adjusted signal is just clear of the leading edge of said pulse.

References Cited

UNITED STATES PATENTS

| | | | |
|---|---|---|---|
| 2,982,852 | 5/1961 | Fan. | |
| 3,026,475 | 3/1962 | Applebaum. | |
| 3,310,746 | 3/1967 | Ward | 333—76 XR |
| 3,378,772 | 4/1968 | Kessel | 325—123 XR |

OTHER REFERENCES

Robert M. Lerner, IRE Transactions on Information Theory, A Matched Filter Detection System for Complicated Doppler Shifted Signals, June 1960, Class 33-70T.

RALPH D. BLAKESLEE, Primary Examiner

A. J. MAYER, Assistant Examiner

U.S. Cl. X.R.

325—42, 65, 133; 333—70; 343—17.1